(12) United States Patent
Shao et al.

(10) Patent No.: US 8,515,471 B2
(45) Date of Patent: Aug. 20, 2013

(54) SYSTEM AND METHOD FOR WIRELESS COMMUNICATION NETWORK USING BEAMFORMING AND HAVING A MULTI-CAST CAPACITY

(75) Inventors: Huai-Rong Shao, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 898 days.

(21) Appl. No.: 12/032,505

(22) Filed: Feb. 15, 2008

(65) Prior Publication Data

US 2009/0210474 A1  Aug. 20, 2009

(51) Int. Cl.
*H04H 20/71* (2008.01)
*H04B 7/00* (2006.01)
*H04B 15/00* (2006.01)

(52) U.S. Cl.
USPC ............ 455/500; 455/3.01; 455/59; 455/503; 370/312; 370/432

(58) Field of Classification Search
USPC ................. 455/3.01, 3.06, 91, 506, 63, 4, 65, 455/101–105, 3.02, 59, 61, 500, 503; 370/312, 370/335–336, 339, 342–345, 432
See application file for complete search history.

(56) References Cited

U.S. PATENT DOCUMENTS

| | | | |
|---|---|---|---|
| 6,157,612 A * | 12/2000 | Weerackody et al. | 370/215 |
| 6,256,509 B1 | 7/2001 | Tanaka et al. | |
| 6,754,176 B1 | 6/2004 | Gubbi et al. | |
| 6,850,502 B1 * | 2/2005 | Kagan et al. | 370/330 |
| 7,149,238 B2 * | 12/2006 | Agee et al. | 375/141 |
| 7,321,580 B1 * | 1/2008 | Ramanathan et al. | 370/339 |
| 7,567,583 B2 * | 7/2009 | Miyoshi | 370/465 |
| 7,805,167 B1 * | 9/2010 | Esmailzadeh | 455/562.1 |
| 2005/0002421 A1 * | 1/2005 | Ito et al. | 370/474 |
| 2005/0053015 A1 | 3/2005 | Jin et al. | |
| 2005/0276245 A1 * | 12/2005 | Hidaka | 370/328 |

(Continued)

FOREIGN PATENT DOCUMENTS

EP 0709982 B1 6/2004

OTHER PUBLICATIONS

Chaporkar, Prasanna. Wireless Multicast: Theory and Approaches. *IEEE Transactions on Information Theory*, vol. 51, No. 6, Jun. 2005.

(Continued)

*Primary Examiner* — Simon Nguyen
(74) *Attorney, Agent, or Firm* — Kenneth L. Sherman, Esq.; Michael Zarrabian, Esq.; Sherman & Zarrabian LLP

(57) ABSTRACT

A method and system for sending the same data in multiple directions via directional transmission is disclosed. One embodiment of the invention allows for processing power to be saved by introducing a buffer in the physical (PHY) layer, after some baseband (BB) processing has been performed. In one embodiment of the invention the method comprises receiving data from a MAC layer, performing preliminary processing on data in the PHY layer, storing the preliminarily processed data in a buffer located in the PHY layer, performing secondary processing on the preliminarily processed data, transmitting the secondarily processed data in a first direction, via directional transmission, reading the preliminarily processed data from the buffer, performing secondary processing on the preliminarily processed data, and transmitting the secondarily processed data in a second, third, fourth and so-on direction.

33 Claims, 10 Drawing Sheets

(56) References Cited

U.S. PATENT DOCUMENTS

| | | | |
|---|---|---|---|
| 2007/0268868 A1 | 11/2007 | Singh et al. | |
| 2008/0192661 A1* | 8/2008 | Hamamoto et al. | 370/310 |
| 2009/0232243 A1* | 9/2009 | Tsuboi et al. | 375/267 |
| 2009/0323563 A1* | 12/2009 | Ho et al. | 370/280 |
| 2009/0323646 A1* | 12/2009 | Ketchum et al. | 370/338 |

OTHER PUBLICATIONS

FreshNews.com, SiBEAM Receives Equity Investment from Best Buy, http://freshnews.com/print/node/261440, Jan. 4, 2010, 2 pages.

Hachman, "CE Giants back Amimon's Wireless HDTV Tech," online: www.pcmag.com, 1 page, Jul. 23, 2008.

IEEE 802.15.3 Working Group. Part 15.3: Wireless medium access control (MAC) and physical layer (PHY) specifications for high rate wireless personal area networks (WPAN). IEEE Draft Standard, Draft P802.15.3/D16, Feb. 2003, pp. 1-362.

LG Electronics Inc., WirelessHD Specification Version 1.0 Overview, Oct. 9, 2007, 77 pages.

Maruhashi et al., Wireless uncompressed-HDTV-signal; transmission system utilizing compact 60-GHz-band transmitter and receiver, Microwave Symposium Digest, 2005 IEEE MTTS International, Jun. 12-17, 2005, pp. 1867-1870.

MBOA, Distributed Medium Access Control (MAC) for wireless networks, WiMedia Alliance, Draft 0.99, Nov. 1, 2005, pp. 1-182.

NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006.).

Van Veen et al., Beamforming: A Versatile Approach to Spatial Filtering, IEEE ASSP Magazine, Apr. 1988, 5(2): 4-24.

International Search Report dated Aug. 14, 2007 for PCT/KR2007/002398, filed May 15, 2007.

International Preliminary Report on Patentability and Written Opinion dated Nov. 17, 2008 for PCT/KR2007/002398, filed May 16, 2007.

* cited by examiner

SYSTEM AND METHOD FOR WIRELESS COMMUNICATION NETWORK USING BEAMFORMING AND HAVING A MULTI-CAST CAPACITY

FIELD OF THE INVENTION

The present inventions relates to wireless transmission of the same data in multiple directions.

DESCRIPTION OF THE RELATED TECHNOLOGY

With the proliferation of high quality video, an increasing number of electronic devices, such as consumer electronic devices, utilize high definition (HD) video which can require multi-Gbps (gigabits per second) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies cannot provide enough bandwidth to support the transmission of uncompressed HD video signals. In addition, the WLAN and similar technologies can suffer interference issues when several devices that do not have the bandwidth to carry the uncompressed HD signals are connected together.

SUMMARY OF CERTAIN INVENTIVE ASPECTS

One aspect of the invention is a method of sending the same data in multiple directions, the method comprising performing preliminary processing on the data, storing the preliminarily processed data in a buffer, performing secondary processing on the preliminarily processed data, transmitting the secondarily processed data in a first direction, reading the preliminarily processed data from the buffer, performing secondary processing on the preliminarily processed data, and transmitting the secondarily processed data in a second direction.

Another aspect of the invention is a system for sending the same data in multiple directions, the system comprising a path selection module configured to select between a plurality of paths, including a first path and a second path, a preliminary processing module configured to, when the first path is selected, perform preliminary processing on data, a buffer configured to store the preliminarily processed data, a secondary processing module configured to, when the first path is selected, receive the preliminarily processed data from the preliminary processing module and perform secondary processing on the preliminarily processed data for transmission in a first direction, further configured to, when the second path is selected, read the preliminarily processed data from the buffer and perform secondary processing on the preliminarily processed data for transmission in a second direction, and a transmitter configured to transmit the secondarily processed data.

DETAILED DESCRIPTION OF CERTAIN INVENTIVE EMBODIMENTS

Figure 1:
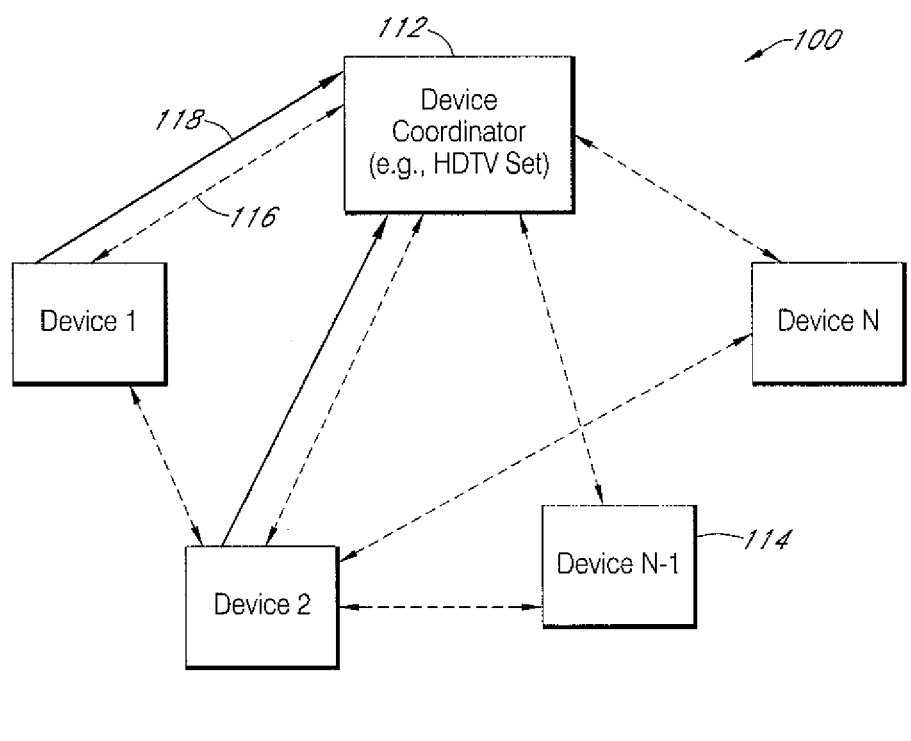
FIG. 1 is a functional block diagram of a wireless network that implements transmission between wireless devices according to one embodiment of the invention.

Certain embodiments provide a method and system for transmission of the same data in multiple directions.
System Overview Example embodiments of the invention in a wireless system will now be described. FIG. 1 shows a functional block diagram of a wireless network 100 that implements data transmission between devices such as a device coordinator and stations, according to certain embodiments. In other embodiments, one or more of the devices can be a computer, such as a personal computer (PC). The network 100 includes a device coordinator 112 and multiple stations 114 (e.g., Device 1 . . . Device N). The stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114.

Each station 114 uses the low-rate channel 116 for communications with other stations 114. The high-rate channel 118 supports single direction unicast transmission over directional beams established by beamforming, with e.g., multi-Gb/s bandwidth. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. In another embodiment, the receiver 112 may be a projector. The sender 114 can be a source of uncompressed video or audio. Examples of the sender 114 include a set-top box, a DVD player or recorder, digital camera, camcorder, other computing device (e.g., laptop, desktop, PDA, etc.), and so forth.

Figure 2:
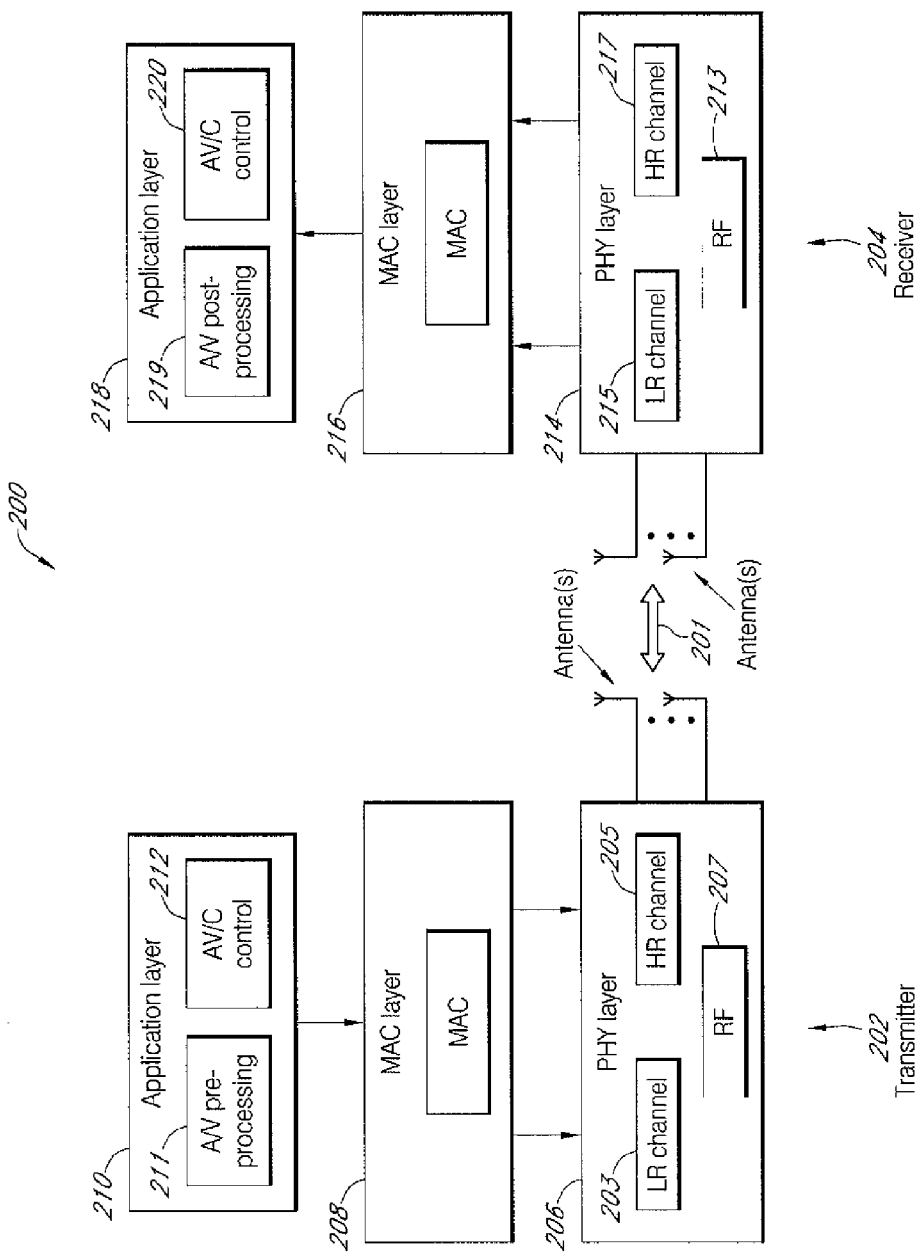
FIG. 2 is a functional block diagram of an example communication system for transmission over a wireless medium, according to one embodiment of the invention.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Within the 60 GHz band, a massive amount of spectral space (at least 5 GHz in most countries) has been allocated worldwide for unlicensed wireless applications. With this wide band it is possible to support very high-speed applications such as uncompressed High Definition (HD) video streams and large file transfers.

At 60 GHz, there is much more free space attenuation than at 2 or 5 GHz since free space attenuation increases quadratically with frequency. This higher free space attenuation can be compensated by the use of directional antennas. As used herein, directional antennas include beamformed antenna arrays, sector antennas, and other antennas with a non-omnidirectional beam pattern. The beampattern of a directional antenna is not limited to a single angular beam, and may be arbitrarily shaped.

Figure 3A:
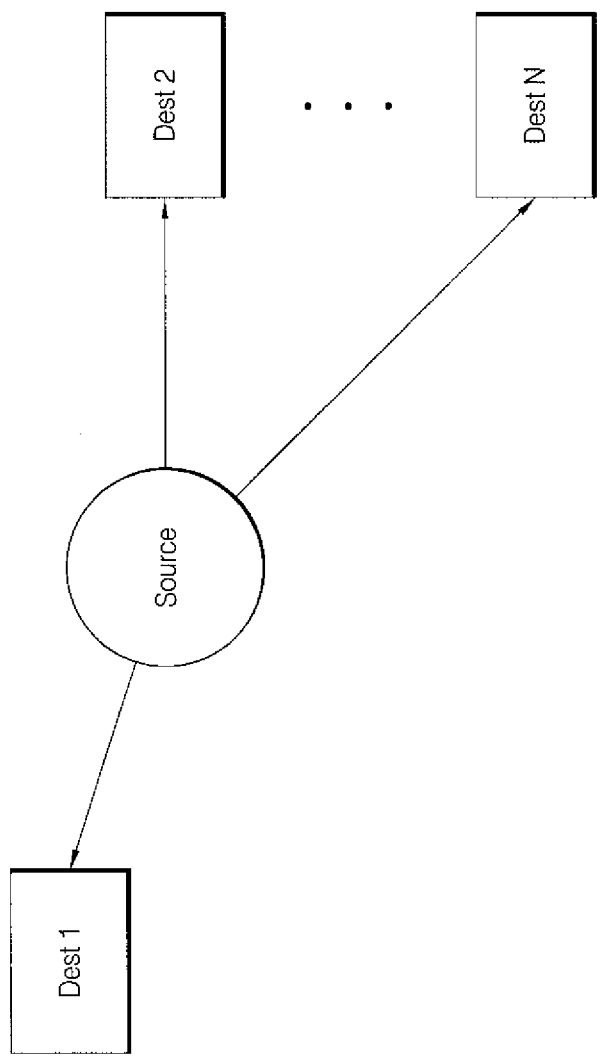
FIG. 3A is an abstract model of multicast transmission corresponding to one embodiment of the invention.

Directional transmission is suitable for point-to-point transmission, i.e. from a single source to a single receiver. However, a lot of applications require transmission from a single source to multiple receivers, and thus have point-to-multipoint transmission requirements. Multicast transmission, as used herein, refers to the transmission of the same data from a single source to multiple receivers. The multicast applications discussed in this section can be applied to the transmission of uncompressed video data, as will be discussed, or to other types of wireless data networks, such as WLAN. FIG. 3A is an abstract model of multicast transmission corresponding to one embodiment of the invention. In general, a source of information transmits data to a number of destinations, each located in a different direction. In this context, direction means requiring a different beamforming pattern such that information is focused in that location. If more than one device are located proximal to one another such that data can be transmitted to both using the same beam pattern, the two devices can be considered in the same direction and treated, in some embodiments, as a single device for processing by the system.

Figure 3B:
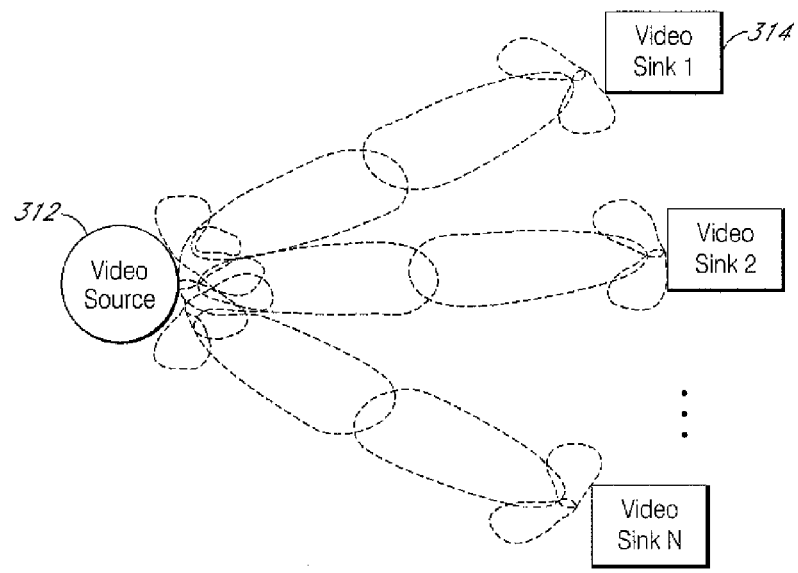
FIG. 3B is an example network topology of a system utilizing the method of the invention to transmit video data from a source to multiple sinks.

For example, in a sport bar there could be two or more TVs (or displays) which playback the same audio/visual (A/V) content simultaneously. Currently, video cables are used from a video source device 312 such as DVD player or STB (set-top box) to multiple TVs or other display devices. With 60 GHz wireless technology, these cables can be removed as shown in FIG. 3B. Video information sent to different sinks 314 need to be synchronized during transmission and playback. For video applications, it is a common scenario that the video data is not pre-stored in the source device. Instead, the video data is directly and continuously input to the source device. For example, in a sports bar, the set-top box may receive live video coverage of a sporting event over a cable or satellite connection. It requires a great deal of processing to input the real-time video data to a plurality of independent transmission sessions, to a plurality of televisions. Although, the delay due to processing can be somewhat mitigated by allowing the application layer of the set-top box to make a plurality of copies of the video data for independent processing, this increases the buffer size and buffer reading/writing speed requirements, as well as wasting a lot of power redundantly doing the same processing on the same data a number of times. With multicast support at the PHY layer, the processing delay is reduced, since the PHY layer doesn't need to process the same data several times. Additionally, power consumption is reduced since redundant signal processing is bypassed. As a second example, in a large conference room, there may be two or three big screens in the front of the conference room. The video content sent to these screens should also be synchronized. In the above two examples, the transmitter and the receivers are usually at fixed positions. However, the channel could be NLOS (non-line-of-sight) since human beings may move around. Another feature of this application class is that the video connections usually last long time.

In another example, not necessarily involving video transmission, a computer may store multiple copies of the same data to several internal and external storage devices such as hard disks, flash memory cards, and memory sticks, and keep these multiple copies synchronized. In this scenario, the transmitter and the receivers are usually at fixed positions. However, most likely the channel will be LOS (line-of-sight) since the devices are very close to each other.

Figure 3C:
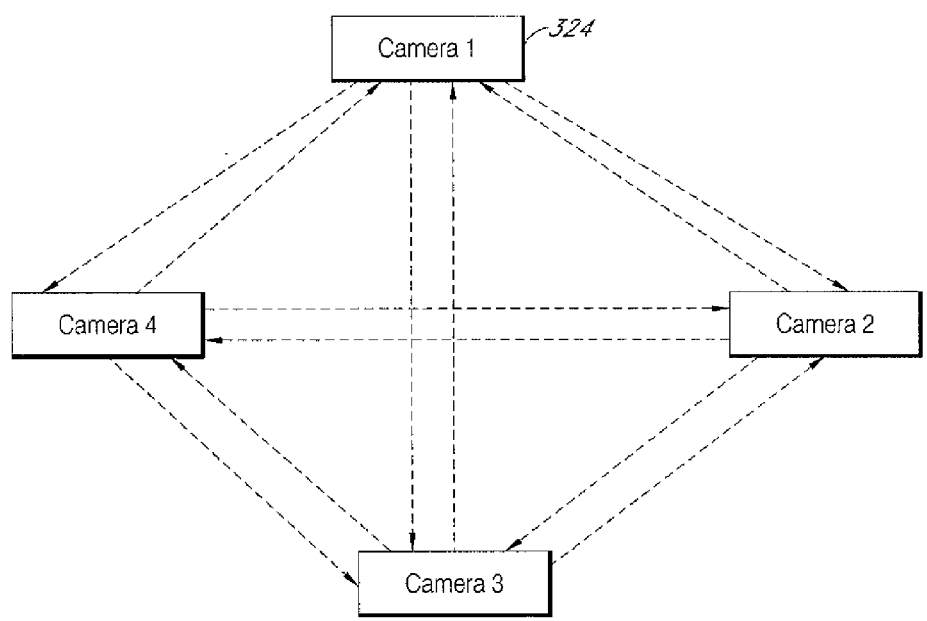
FIG. 3C is a functional block diagram of a system unitizing the method of the invention to transmit video or image data between cameras or camcorders.

Digital cameras and camcorders are becoming more and more popular. In many social events, such as a family reunion dinner or various parties among friends, multiple cameras are used to take pictures. Currently, the users share the pictures by sending e-mails to each other, or putting the pictures into public websites and then sending e-mails with the webpage addresses. Thus, it takes a great deal of time and effort for the users to get the pictures taken by others. With 60 GHz wireless, a picture can be directly sent to other cameras 324 and stored immediately after the picture is taken as shown in FIG. 3C.

In yet another example, during a meeting, users may want to share some files, such as presentations. Currently users mainly pass USB memory sticks to do this if e-mail access is not feasible. It takes long time to finish such a USB-passing procedure. By using a 60 GHz wireless channel, files can be easily multicast to other users' laptops. In this scenario, the transmitter and the receivers could be portable and mobile devices. The channel could be NLOS since human beings may move around. Another feature of this application class is that the actual transmission time for each file could be very short, though device discovery and connection maintenance may last a long time.

In some wireless HD systems, the baseband part of the PHY layer conducts signal processing for the frames from the MAC layer and the output signals are moved to the RF part for antennas to transmit. In previous embodiments of such transmission systems, for transmission to N destinations, the same frame payload would be processed N times at the baseband (BB) part and then sent out on the antennas to different destinations. To reduce the process redundancy at the sender baseband part, the present invention introduces a buffer at the PHY layer to temporally store the signals after some baseband processing has taken place in one or more baseband function blocks for transmission to the first destination. To transmit the same payload data to the following destinations, the baseband part of the sender can bypass those function blocks and pull data directly from the buffer as an input signal for the remaining function blocks. This kind of mechanism can help the PHY layer save processing power.

Figure 4:
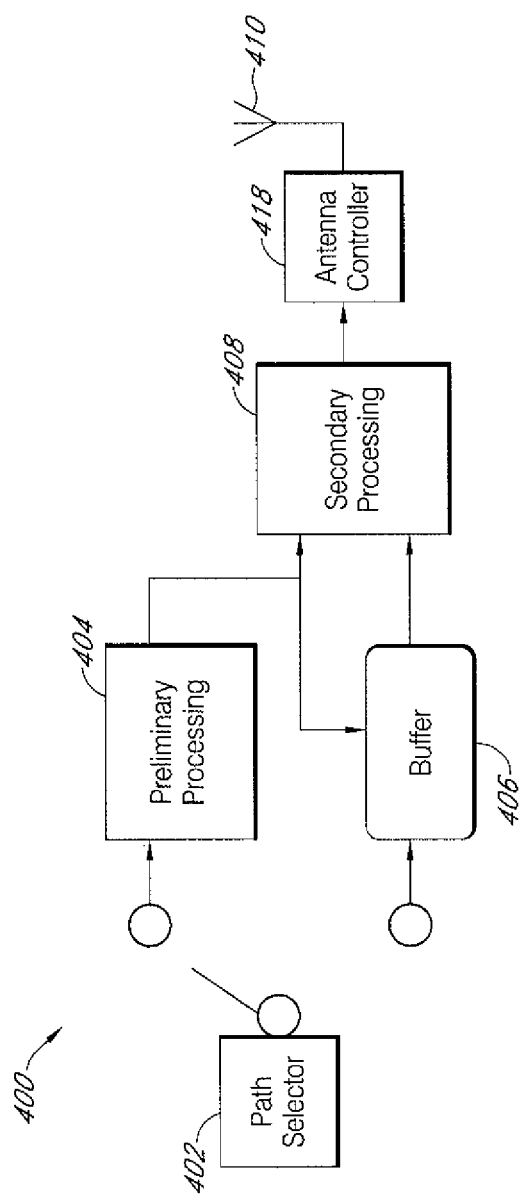
FIG. 4 is a functional block diagram of a system for transmitting the same data in multiple directions.

FIG. 4 is a functional block diagram of a system for transmitting the same data in multiple directions. The system 400 comprises a path selector 402, a preliminary processing module 404, a buffer 406, a secondary processing module 408, an antenna controller 418, and a transmitter 410. When the first path is selected, data is processed fully by the preliminary processing module 404 and the secondary processing module 408. The antenna controller 418 (which, in an alternative embodiment is part of the secondary processing module 408) designates the direction the transmitter should transmit information, either by moving the transmitter, specifying different beamforming weights, or any of a number of methods well-known by those skilled in the art. The processed data is then transmitted by the transmitter 410 in a specified direction. In between the preliminary processing 404 and secondary processing 408, the preliminarily-processed data is stored in a buffer 406, such that the preliminary processing needn't be performed on the same data twice. To transmit in other directions, the second path is chosen, and preliminarily-processed data is read from the buffer, and secondary processing 308 is performed. Again, the antenna controller designates the direction the transmitter should transmit information and the fully-processed data is, as before, sent via the transmitter 410. The transmitter may comprise an antenna, or preferably, a plurality of antennae. In the case the transmitter comprises a plurality of antennae, the secondary processing 408 and/or antenna controller 418 may weight the transmission from each of the plurality of antenna to perform beamforming to achieve transmission in different directions.

The path selector 402 may be implemented in hardware, firmware, software, or any combination thereof. For example, the path selector may be a designation in a heading that logically indicates which processing must be done. Similarly, the preliminary processing module 404, secondary processing module 408, and antenna controller 418 may also be implemented in hardware, firmware, software, or any combination thereof.

Figure 5:
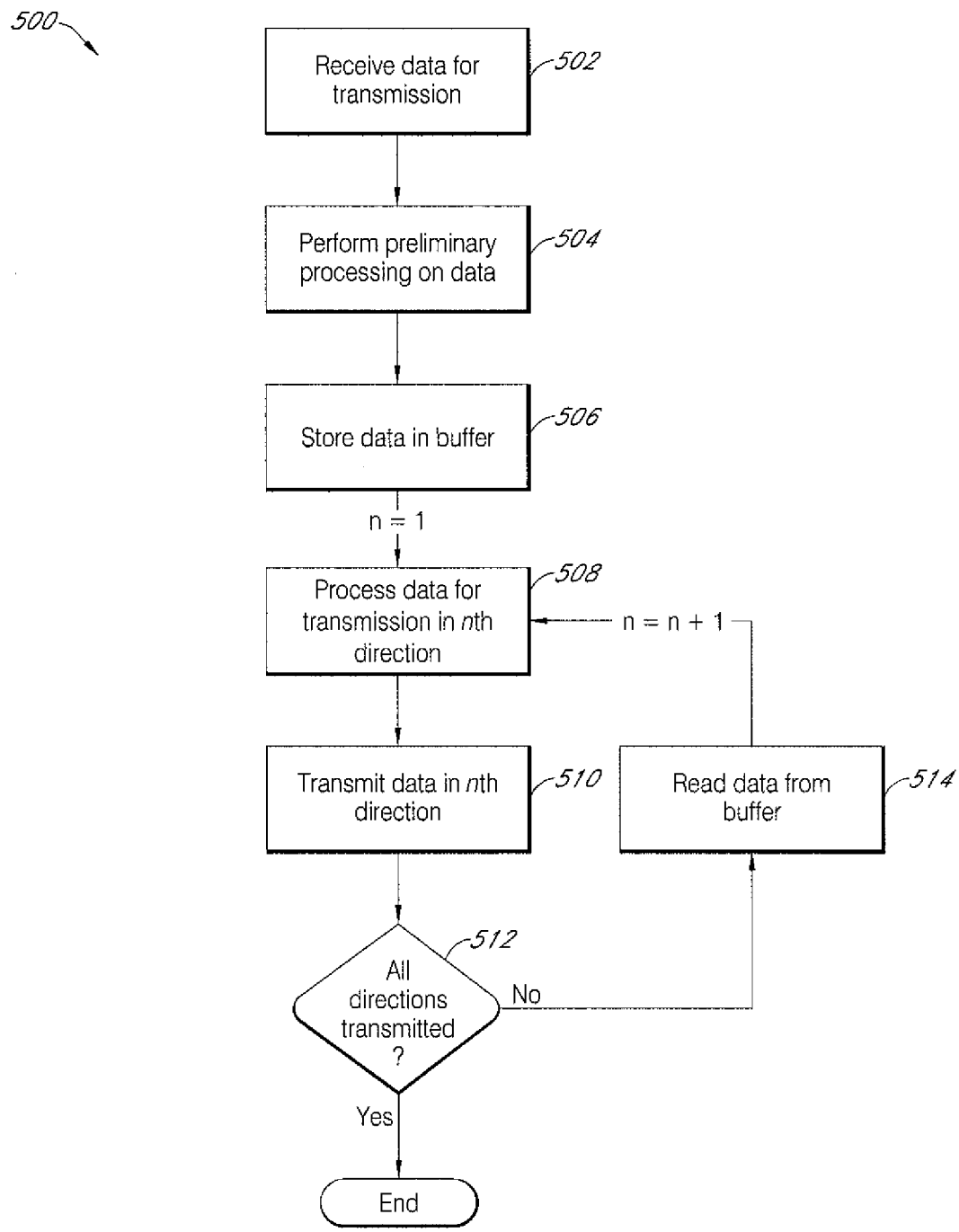
FIG. 5 is flowchart which shows a procedure for transmitting the same in multiple directions.

FIG. 5 is flowchart which shows a procedure for transmitting the same data in multiple directions. The procedure 500 begins by receiving data 502 that is to be transmitted to one or more locations. The next stage is to perform preliminary processing on the data. This may include, but is not limited to, outer encoding, such as Reed-Solomon coding, interleaving, parsing, convolutional encoding, multiplexing, bit interleaving, constellation-mapping, tone interleaving, Fourier and inverse Fourier transforming, guard interval insertion, or windowing. After preliminary processing 504, the data is stored in a buffer 506. The buffer may be located in the PHY layer. The next stage is to process the data for transmission in the nth direction 508, where n is one the first time in the stage, and increases every time the stage is performed. Again, this processing may include outer encoding, such as Reed-Solomon coding, interleaving, parsing, convolutional coding, multiplexing, bit interleaving, constellation-mapping, tone interleaving, Fourier and inverse Fourier transforming, guard interval insertion, windowing, or beamforming. The next stage is to transmit 510 the data in the nth direction. If the data has been transmitted in each of the directions, the process ends. If not, the preliminarily-processed data is read from the buffer 514, and processed for transmission in the next direction 508. The final stages repeat until the data has been transmitted in all directions.

Figure 6A:
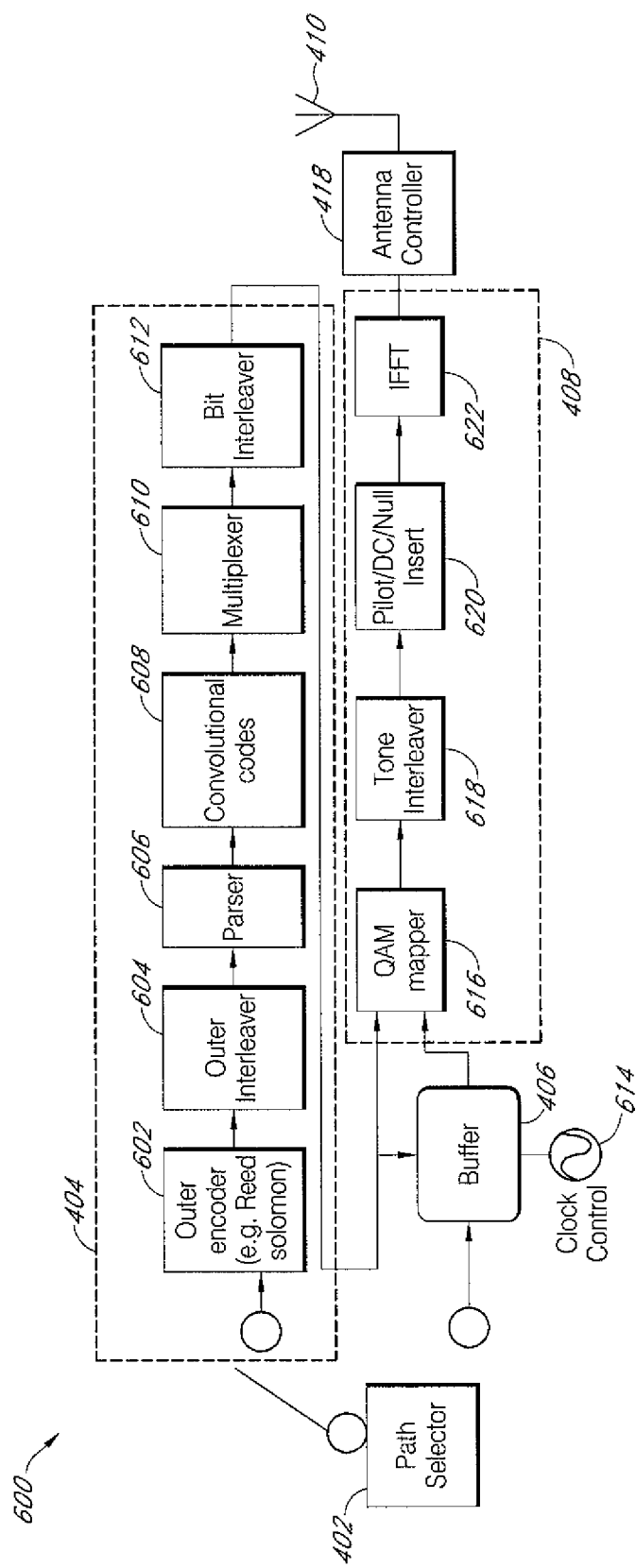
FIG. 6A is an exemplary embodiment of the system of FIG. 3.

FIG. 6A is an exemplary embodiment of the system of FIG. 4. It shows a baseband solution to support multicast at the PHY layer. In this embodiment, a path selector 402 is used to control which path the baseband will conduct for a frame. In some embodiments, a frame consists of PHY header and PHY payload. In a multicast group, PHY headers to different destinations may be different, however, the payload parts are substantially the same. In some embodiments, the header may give instructions as to which path the processing should follow, including specifications concerning which direction to transmit information. When processing the frame to the first destination, the path starting from an outer encoder 602 will be selected for both the PHY header and the PHY payload. For other destinations, the path starting from outer encoder 602 will be selected for the PHY header but the path starting from the buffer 406 will be selected for the PHY payload. Since time slots are scheduled to different destinations in a round robin pattern, the path selector can easily know when to use first path or the second path. A frame payload processed at the first path may include being processed by an outer encoder 602, an outer interleaver 604, a parser 606, a convolutional encoder 608, a multiplexer 612, and/or a bit interleaver 612.

In the shown embodiment of the system 600, data is first processed by the outer encoder 602. The outer encoder 602 adds redundant data to the data input to the subsystem. The redundant data allows the receiver to detect and correct errors without asking the transmitter for additional data. In adding redundant data to the data, the encoder can use various error correction codes as a Reed-Solomon (RS) encoder. In other embodiments, the system may use various other encoders, including, but not limited to, a convolutional code (CC) encoder a low-density parity-check (LDPC) encoder, a Hamming encoder, and a Bose, Ray-Chaudhuri, Hocquenghem (BCH) encoder.

The data output from the outer encoder is processed by an outer interleaver 604. The outer interleaver 604 rearranges a sequence of data bits received from the outer encoder 602. The outer interleaver serves to provide further error-protection over data transmitter over a wireless medium. The data from the outer interleaver 604 is processed by a parser 606 which parses the bit stream into a plurality of bit streams. The data output from the parser 606 is processed by a convolutional code (CC) encoder 608. As mentioned above, in other embodiments, the system may use various other encoders. The data output from the convolutional code (CC) encoder 608 is processed by the multiplexer 610. The multiplexer 610 serves to condense the data into a single bit stream. This bit stream is output from the multiplexer 610 and input into the bit interleaver 612. The bit interleaver 612 rearranges a sequence of data bits received from the multiplexer 610. The bit interleaver 612 also serves to provide further error-protection over data transmitted over a wireless medium. When a frame payload is processed at the first path, the signal output from a bit interleaver 612 will be input to both a QAM (quadrature amplitude modulation) mapper 616 and the buffer 406. The mapper 616 maps data bits to complex (IQ) symbols. The complex symbols are used to modulate a carrier for the wireless transmission described above. Although the mapper 616 in the system 600 described is a QAM mapper, other modulation schemes can be used, including, but not limited to, Binary Phase-Shift Keying (BPSK), Quadrature Phase-Shift Keying (QPSK), and Quadrature Amplitude Modulation (QAM). In the system 600 shown, the mapper 616 is a QAM mapper, for example, a 16-QAM mapper or 64-QAM mapper. QAM is a modulation scheme which conveys data by modulating the amplitude of two carrier waves. The two waves, usually two orthogonal sinusoids, are out of phase with each other by 90° and thus are called quadrature carriers. The number, 16 or 64, in front of "QAM" refers to the total number of symbols to which the mapper can map groups of data bits. For example, a 16-QAM mapper converts 4-bit data into $2^4=16$ symbols. Typically, for QAM mappers, a constellation diagram is used for representing the collection of such symbols.

The output of the mapper 616 is sent to a tone interleaver 618 that rearranges the sequence output from the mapper. The illustrated tone interleaver 618 is positioned after the mapper 616. In other embodiments, the tone interleaver 618 may be positioned between functionally prior to the mapper 618 in place of the bit interleaver 612. In one embodiment, the tone interleaver 618 can include a random interleaver which employs a fixed random permutation order and interleaves tones according to the permutation order. For example, the random interleaver may use Radix-2 FFT (fast Fourier transform) operation. In other embodiments, the tone interleaver 618 can include a block interleaver. A block interleaver accepts a set of symbols and rearranges them without repeating or omitting any of the symbols in the set. The number of symbols in each set is fixed for a given interleaver. The interleaver's operation on a set of symbols is independent of its operation on all other sets of symbols. The output of the tone interleaver 618 is sent to the pilot/DC/null inserter 620 which adds additional data to ensure the functionality of the wireless channel. The output from the pilot/DC/null inserter 620 is sent to an inverse Fast Fourier Transform (IFFT) module 622.

The IFFT 622 transforms frequency domain data from the error-correcting, mapping and interleaving modules back into corresponding time domain data. The IFFT module 622 converts a number of complex symbols, which represent a signal in the frequency domain, into the equivalent time domain signal. The IFFT module 622 also serves to ensure that carrier signals produced are orthogonal.

The signal stored in the buffer 406 will be used for transmission to other destinations. When the second path is chosen, a clock control 614 component may control when the signals stored in the buffer 406 is input to the QAM mapper 616 to ensure signal from the bit interleaver 612 and from the buffer 406 to the QAM mapper 616 have the same time pattern. In both cases, as described with respect to FIG. 4, the data is transmitted using a transmitter 410, in which the transmission direction is controlled by an antenna controller 418.

Figure 6B:
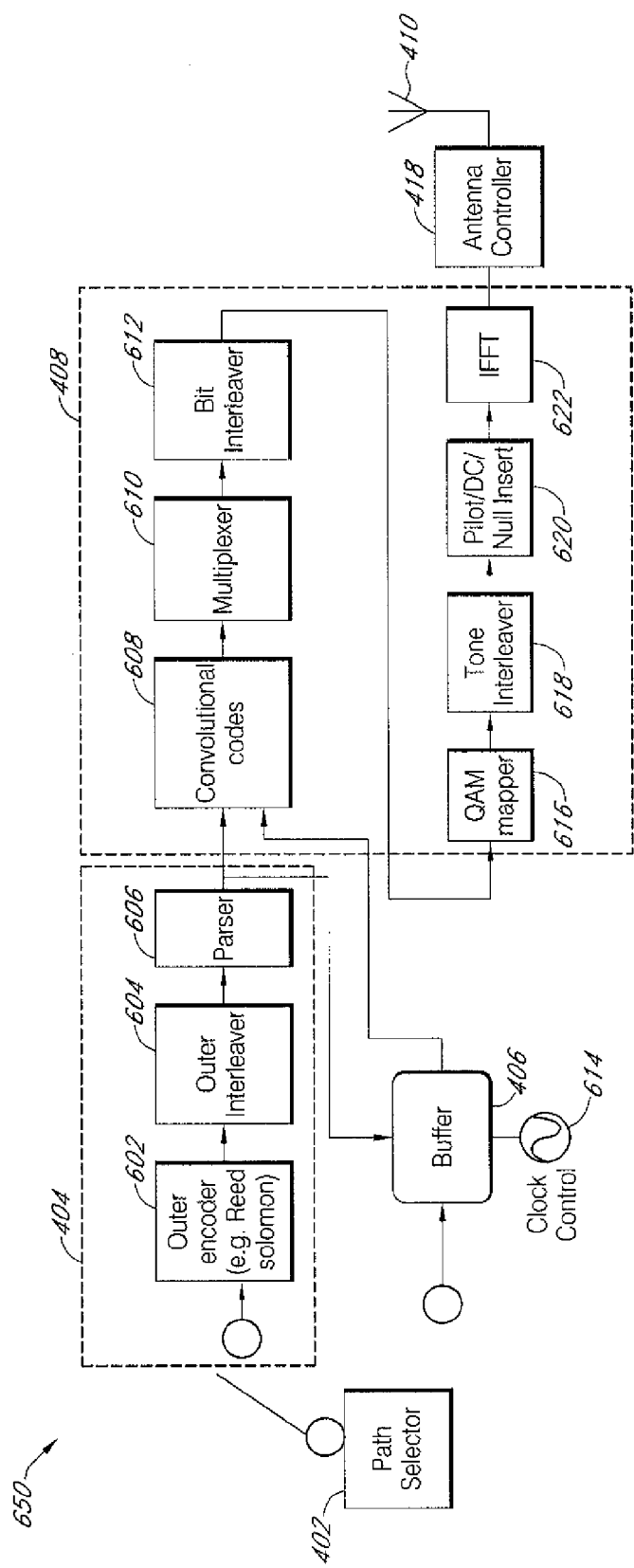
FIG. 6B is another exemplary embodiment of the system of FIG. 3.

FIG. 6B is another exemplary embodiment of the system of FIG. 4. In this embodiment of FIG. 6A, the solution assumes that the same convolutional coding scheme is used for transmissions to different destinations; however, different modulation schemes can be used for different destinations. If the convolutional coding schemes are different for different destinations, the buffer needs to be moved before the convolutional coding block as shown in FIG. 6B. In general, the buffer may be accessed at a number of points in the processing of data. It is understood that the placement of the buffer in the system chain is not limited to the two embodiments described, but rather could be placed at any of a number of locations along the chain.

Figure 7:
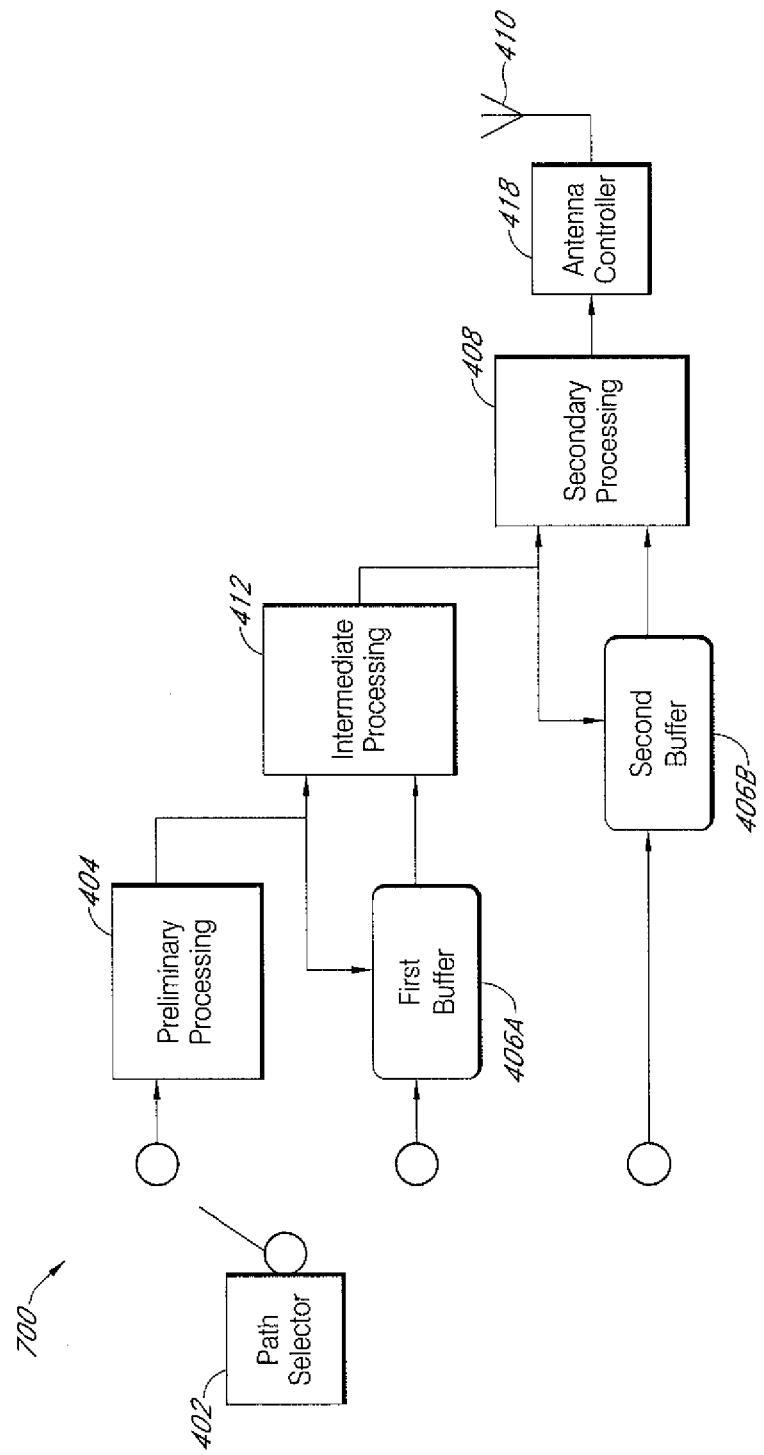
FIG. 7 is a functional block diagram of a system for transmitting the same data in multiple directions utilizing two buffers.

In another embodiment of the invention, there is more than one buffer. Such an embodiment may, for example, combine the functionality of the embodiments described with respect to FIGS. 6A and 6B. Such a system may find use when the same convolutional coding scheme is used for a set of multiple directions and a different convolutional coding scheme is used for another set of multiple directions. FIG. 7 is a functional block diagram of a system for transmitting the same data in multiple directions utilizing two buffers. The system comprises a path selector 402, a preliminary processing module 404, a first buffer 406A and a second buffer 406B, a secondary processing module 408, an antenna controller 418, a transmitter 410, and an intermediate processing module 412. In this embodiment, the path selector 402 can choose between three paths, as opposed to the two paths shown in FIG. 4. This embodiment differs from the embodiment described with respect to FIG. 4 in the addition of an intermediate processing module 412 and the addition of a second buffer 406B. As mentioned, such as system may find use when the same convolutional coding scheme is used for a set of multiple directions and a different convolutional coding scheme is used for another set of multiple directions. In this case, the preliminary processing module 404 may comprise an outer encoder, an outer interleaver, and a parser. The data from the preliminary processing module 404 is stored in the first buffer 406A. The intermediate processing module 412 may comprise a convolutional encoder, a multiplexer, and a bit interleaver. The data from the intermediate processing module 412 is stored in the second buffer 406B. The secondary processing module 408 may comprise a QAM mapper, a tone interleaver, an pilot/DC/null inserter, and an inverse Fourier transform module.

Figure 8:
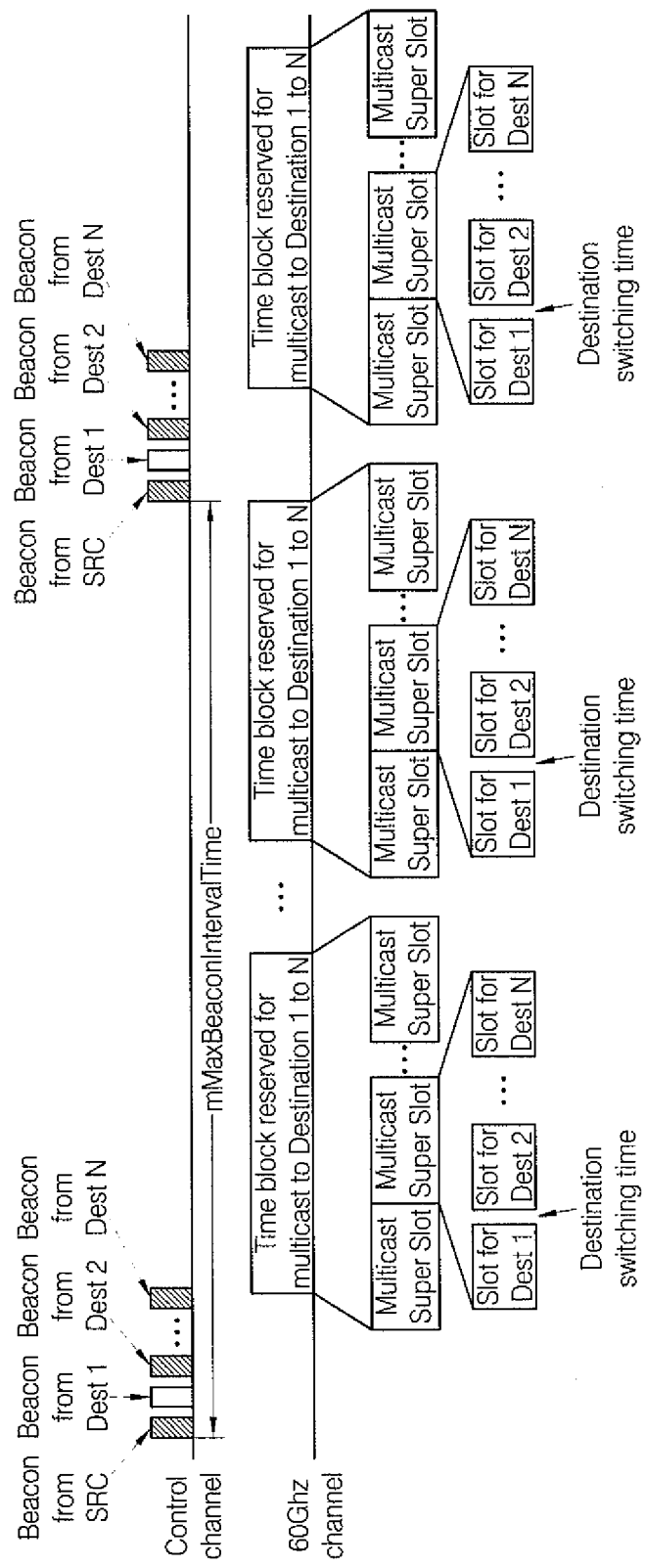
FIG. 8 is a diagram of the time-division multiplex procedure for sending multiple blocks of data in multiple directions.

In one embodiment of the invention, channel time blocks can be allocated in a round robin pattern among different destinations as shown in FIG. 8. One reserved channel time block may consist of one or multiple multicast super slots, and each multicast super slot may consist of slots for all destinations in the multicast group separated by a destination switching time. The destination switching time is used by the source to change the direction of transmission to the next destination. The size of slots depends on several factors such as buffer capability at the source and receiver, jitter requirement, and the destination switching time. Different destinations can have different slot sizes if different MCSs (modulation and coding schemes) are used in transmission to different destinations.

In one embodiment, the 60 GHz network works in an infrastructure mode, and beacons sent from the coordinator will carry the schedule information of the multicast transmission. However, in another embodiment, an ad-hoc mode with out-of-band control channel is assumed, where both the source device and all destinations will send out beacons to carry the schedule information of the multicast transmission within each mMaxBeaconIntervalTime period as shown in FIG. 8. Interference issue caused by hidden terminals can be avoided by asking each destination to send out beacons periodically.

Although, time-division multiplexing access (TDMA) has been described to transmit data in multiple directions while maintaining synchronicity between the data at each receiver, an alternative solution is to transmit multiple copies of the same data in different directions using frequency-division multiplexing access (FDMA) wherein the same data is transmitted in different directions at different frequencies.

While the above description has pointed out novel features of the invention as applied to various embodiments, the skilled person will understand that various omissions, substitutions, and changes in the form and details of the device or process illustrated may be made without departing from the scope of the invention. For example, although embodiments of the invention have been described with reference to uncompressed video data, those embodiments can be applied to compressed video data as well. Therefore, the scope of the invention is defined by the appended claims rather than by the foregoing description. All variations coming within the meaning and range of equivalency of the claims are embraced within their scope.

What is claimed is:

1. A method of sending the same data in multiple directions via directional wireless transmission, the method comprising:
   performing preliminary processing on initially received data;
   storing the preliminarily processed data in a buffer;
   performing secondary processing on the preliminarily processed data a first time;
   initially transmitting the secondarily processed data in a first direction;
   reading the preliminarily processed data from the buffer;
   performing secondary processing on the preliminarily processed data a second time;
   initially transmitting the secondarily processed data in a second direction,
   wherein the secondarily processed data is multicast in different directions,
   wherein after the initially received data is preliminary processed and stored in the buffer once, the data in the buffer is used multiple times for the secondary processing of the data the first time and the second time reducing data processing for initially multicasting the data in said different directions.

2. The method of claim 1, further comprising, before performing preliminary processing, initially receiving the data from an application layer, wherein the data has already been subject to audio/visual (A/V) pre-processing.

3. The method of claim 1, wherein the buffer is located in a physical (PHY) layer.

4. The method of claim 1, wherein the preliminary processing comprises baseband processing including encoding and first interleaving of the initially received data.

5. The method of claim 4, wherein the preliminary processing further comprises parsing, and multiplexing, wherein the encoding comprising outer encoding and convolutional encoding, and the first interleaving comprising outer interleaving and bit interleaving.

6. The method of claim 5, wherein the secondary processing comprises beamforming including mapping and second interleaving on the preliminary processed data.

7. The method of claim 6, wherein the secondary processing further comprises multiplexing, and inverse fast fourier transform (IFFT) processing, the mapping comprises quadrature amplitude modulation (QAM) mapping, and the second interleaving comprises tone interleaving.

8. The method of claim 7, wherein the secondary processing further comprises coding.

9. The method of claim 8, wherein the coding performed for transmission in the first direction is different than the coding performed for transmission in the second direction.

10. The method of claim 1, further comprising transmitting the secondarily processed data in at least one additional direction, wherein the at least one additional direction is different from the second direction.

11. The method of claim 1, wherein transmitting in a first direction and transmitting in a second direction are performed at different times.

12. The method of claim 1, wherein transmitting in a first direction and transmitting in a second direction are performed simultaneously at different frequencies.

13. The method of claim 1, wherein the data is high definition uncompressed video data.

14. The method of claim 1, wherein performing secondary processing a first time and performing secondary processing a second time involves separate and distinct processing.

15. The method of claim 1, wherein transmitting comprises transmitting at 60 GHz (gigahertz).

16. The method of claim 1, wherein data transmitted in either the first direction or the second direction is read by a plurality of devices.

17. The method of claim 1, wherein the secondarily processed data is transmitted in different directions repeatedly using a single preliminary processing of initially received data for multiple secondary processing.

18. The method of claim 1, wherein multicasting comprises initial multiple transmission of the same data from the buffer to multiple receivers each located in a different location, wherein said multiple transmission comprises transmission of different beamforming patterns for each different location.

19. The method of claim 1, wherein between the preliminary processing and secondary processing, data is stored in the buffer such that preliminary processing is only performed on the data once and secondary processing of said data is performed multiple times.

20. The method of claim 1, wherein a path for the first direction is selected for both a PHY header and a PHY payload, and a path for the second direction from the buffer is selected for only a PHY payload.

21. The method of claim 1, wherein different beamforming patterns are used for each multicast direction, and a sender bypasses a preliminary processing function by pulling data from the buffer for multiple secondary processing and transmission to multiple destinations.

22. The method of claim 1, wherein the data in the buffer that is used for the secondary processing of the data the first time and the second time is unchanged for all secondary processing, wherein the secondary processing is based on multicasting in the different directions.

23. The method of claim 22, wherein preliminary processing and storing the data resulting from the preliminary processing only occurs once for each initially received input frame of data.

24. The method of claim 1, wherein the data in the buffer is used for multiple secondary processing without further preliminary processing.

25. The method of claim 1, wherein the secondarily processed data is transmitted in different directions repeatedly for initial transmissions using a single preliminary processing of initially received data for multiple secondary processing.

26. The method of claim 1, wherein the secondarily processed data is transmitted once to multiple receivers using a single preliminary processing of initially received data for multiple secondary processing.

27. A system for wirelessly transmitting the same data in multiple directions, the system comprising:
 a path selection module configured for selecting between a plurality of paths, including a first path and a second path;
 a preliminary processing module configured for, when the first path is selected, performing preliminary processing on initially received data;
 a buffer configured for storing the preliminarily processed data;
 a secondary processing module configured for, when the first path is selected, receiving the preliminarily processed data from the preliminary processing module and performing secondary processing on the preliminarily processed data for transmission in a first direction, further configured for, when the second path is selected, reading the preliminarily processed data from the buffer and perform secondary processing on the preliminarily processed data for transmission in multiple different directions; and
 a transmitter configured for initially transmitting the secondarily processed data by multicasting of the secondarily processed data in different directions using different beamforming patterns,
wherein after the initially received data is preliminary processed and stored in the buffer once, the data in the buffer is used multiple times for multiple secondary processing of the data to reduce data processing for initial multicasting the data in said different directions, wherein the data in the buffer that is used multiple times for multiple secondary processing is unchanged.

28. The system of claim 27, wherein the system is implemented in one of the following: a laptop, a personal computer, a camera, a camcorder, or a DVD player.

29. The system of claim 27, wherein the multicasting is processed in the physical (PHY) layer.

30. The system of claim 27, wherein said preliminary processing comprises encoding and first interleaving of the initially received data, and said secondary processing comprises mapping and second interleaving on the preliminary processed data.

31. The method of claim 30, wherein data that is secondarily processed the first time is processed differently than data that is secondarily processed the second time.

32. A system for wirelessly transmitting the same data in multiple directions, the system comprising:
 means for performing preliminary processing on initially received data;
 means for storing the preliminarily processed data in a buffer;
 means for performing secondary processing on the preliminarily processed data a first time;
 means for transmitting the secondarily processed data in a first direction;
 means for reading the preliminarily processed data from the buffer;
 means for performing secondary processing on the preliminarily processed data from the buffer a second or more times; and
 means for initially transmitting the secondarily processed data in multiple directions by multicasting of the secondarily processed data in different directions using different beamforming patterns,
wherein after the data is preliminary processed and stored in the buffer once, the data in the buffer is used multiple times for multiple secondary processing of the data to reduce data processing for initial multicasting the data in said different directions, wherein the data in the buffer that is used multiple times for multiple secondary processing is unchanged.

33. One or more processor-readable storage devices have processor-readable code, the processor-readable code for programming one or more processors to perform a method of wirelessly transmitting the same data in multiple directions, the method comprising:
 performing preliminary processing on initially received data, said preliminary processing comprising encoding and first interleaving of the initially received data;
 storing the preliminarily processed data in a buffer;
 performing secondary processing on the preliminarily processed data a first time, said secondary processing comprising mapping and second interleaving on the preliminary processed data;
 transmitting the secondarily processed data in a first direction;
 reading the same preliminarily processed data from the buffer;
 performing secondary processing on the preliminarily processed data a second time; and
 initially transmitting the secondarily processed data in multiple directions by multicasting of the secondarily processed data using different beamforming patterns,
wherein after the data is preliminary processed and stored in the buffer once, the data in the buffer is used multiple times for multiple secondary processing of the data to reduce data processing for initial multicasting the data in said different directions, wherein the data in the buffer that is used multiple times for multiple secondary processing is unchanged.

* * * * *